US010755030B2

(12) United States Patent
Hamlin et al.

(10) Patent No.: US 10,755,030 B2
(45) Date of Patent: Aug. 25, 2020

(54) COLOR THEME MAINTENANCE FOR PRESENTATIONS

(71) Applicant: salesforce, inc., San Francisco, CA (US)

(72) Inventors: Drew Hamlin, San Francisco, CA (US); William Joseph Flynn, III, San Francisco, CA (US); Andrew Chung, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 265 days.

(21) Appl. No.: 15/637,096

(22) Filed: Jun. 29, 2017

(65) Prior Publication Data

US 2019/0005016 A1    Jan. 3, 2019

(51) Int. Cl.
*G06F 40/00*     (2020.01)
*G06F 40/103*    (2020.01)
*G06F 40/106*    (2020.01)
*G06F 40/166*    (2020.01)
*G06F 40/186*    (2020.01)
*G06F 16/438*    (2019.01)

(52) U.S. Cl.
CPC ........ *G06F 40/103* (2020.01); *G06F 16/4393* (2019.01); *G06F 40/106* (2020.01); *G06F 40/166* (2020.01); *G06F 40/186* (2020.01)

(58) Field of Classification Search
CPC ...... G06F 17/212; G06F 17/24; G06F 17/248; G06F 16/4393; G06F 17/211; G06F 40/103; G06F 40/106; G06F 40/166; G06F 40/186
See application file for complete search history.

(56) References Cited

U.S. PATENT DOCUMENTS

| 5,956,435 A * | 9/1999 | Buzug ................. G06K 9/6215 382/130 |
| 8,890,886 B2 * | 11/2014 | Kriese ...................... G09G 5/02 345/593 |
| 10,127,468 B1 * | 11/2018 | Lemay ................. H04N 1/3875 |
| 2003/0038832 A1 * | 2/2003 | Sobol ..................... G06T 11/60 715/722 |
| 2004/0177327 A1 * | 9/2004 | Kieffer .................. G06F 17/211 |
| 2006/0265659 A1 * | 11/2006 | Collins ................. G06F 17/211 715/732 |

(Continued)

OTHER PUBLICATIONS

Microsoft PowerPoint, "Create your own theme in PowerPoint", Available via Google since May 16, 2016, 8 pages + 1 Google page (9 pages total).*

(Continued)

*Primary Examiner* — Cesar B Paula
*Assistant Examiner* — David Faber
(74) *Attorney, Agent, or Firm* — Sterne, Kessler, Goldstein & Fox P.L.L.C.

(57) ABSTRACT

Disclosed herein are system, method, and computer program product embodiments providing color theme maintenance for presentations. An embodiment operates by receiving a border image, a background color rule, a text color rule, and compiling the rules into a theme for a presentation. The compiled theme is provided to an application configured to display the presentation including the compiled theme in accordance with the background color rule and the text color rule.

20 Claims, 4 Drawing Sheets

(56) References Cited

U.S. PATENT DOCUMENTS

| | | | |
|---|---|---|---|
| 2007/0106936 A1* | 5/2007 | Nakamura | G06F 17/214 715/236 |
| 2007/0229531 A1* | 10/2007 | Park | G06F 3/0482 345/589 |
| 2007/0257933 A1* | 11/2007 | Klassen | G06T 11/001 345/593 |
| 2007/0291049 A1* | 12/2007 | Edwards | G06Q 30/02 345/593 |
| 2009/0044117 A1* | 2/2009 | Vaughan | G11B 27/034 715/716 |
| 2009/0112652 A1* | 4/2009 | Kelsey | G06Q 10/06 705/7.13 |
| 2009/0189913 A1* | 7/2009 | Moody | G06T 11/60 345/619 |
| 2009/0263016 A1* | 10/2009 | Kuo | G06T 7/0002 382/167 |
| 2010/0053201 A1* | 3/2010 | Klassen | G06T 11/001 345/601 |
| 2010/0174930 A1* | 7/2010 | Kim | G06F 1/3265 713/320 |
| 2011/0208389 A1* | 8/2011 | Tarte | B60K 35/00 701/36 |
| 2011/0234615 A1* | 9/2011 | Hanson | G06F 9/451 345/589 |
| 2012/0076404 A1* | 3/2012 | Bryant | H04N 9/77 382/167 |
| 2013/0044123 A1* | 2/2013 | Shah | G06T 11/001 345/594 |
| 2013/0339907 A1* | 12/2013 | Matas | G06T 11/60 715/853 |
| 2014/0282103 A1* | 9/2014 | Crandall | H04L 65/403 715/753 |
| 2015/0206169 A1* | 7/2015 | Ye | G06Q 30/0242 705/14.41 |
| 2015/0286372 A1* | 10/2015 | Swindell | G06F 3/0481 715/762 |
| 2015/0378578 A1* | 12/2015 | Zhang | G06F 3/048 715/765 |
| 2016/0133030 A1* | 5/2016 | Manuja | G06T 11/001 345/594 |
| 2016/0188136 A1* | 6/2016 | Lopez | G06F 17/24 715/731 |
| 2017/0076697 A1* | 3/2017 | Zhou | H04N 9/3182 |
| 2017/0140241 A1* | 5/2017 | Maloney | G06K 9/4652 |
| 2018/0329869 A1* | 11/2018 | Edge | G06F 17/211 |
| 2018/0357231 A1* | 12/2018 | Kraft | G06T 7/90 |

OTHER PUBLICATIONS

Swinford et al, "Getting Started with PowerPoint: Set Up a Theme", informit, Oct. 25, 2012, 12 pages.*

Presentation Mode in Evernote (https://www.youtube.com/watch?v=RImpdq3wmX8), Published on May 14, 2014, 1page.

* cited by examiner

COLOR THEME MAINTENANCE FOR PRESENTATIONS

CROSS REFERENCE TO RELATED APPLICATIONS

This application is related to U.S. patent application Ser. No. 15/537,729, filed Jun. 29, 2017, entitled "Presentation Collaboration With Various Electronic Devices," U.S. patent application Ser. No. 15/637,717, filed Jun. 29, 2017, entitled "Automatic Layout Engine," U.S. patent application Ser. No. 15/637,762, filed Jun. 29, 2017, entitled "Permission Management of Cloud Based Applications," and U.S. patent application Ser. No. 15/637,077, filed Jun. 29, 2017, entitled "Smart Defaults Based on Previous Settings For Presentation Slides," all of which are hereby incorporated by reference in its entirety.

BACKGROUND

When putting together slides for a presentation, a lot of time must often be spent by a user to configure and adjust the visual appearance of each slide, trying to ensure the visual appearance of the slides are consistent. However when the user changes the format or visual appearance of one slide, the user must then manually go through to make sure the other sides reflect similar changes and that the change did not disrupt the visual consistency of the presentation. This time spent by the user to manually configure, adjust, and maintain the visual appearance of slides both takes away from time the user could use to further develop the actual content of the slides and does not ensure consistency amongst the slide because the slides are still susceptible to poor design practices.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing color theme maintenance for presentations.

Figure 1:
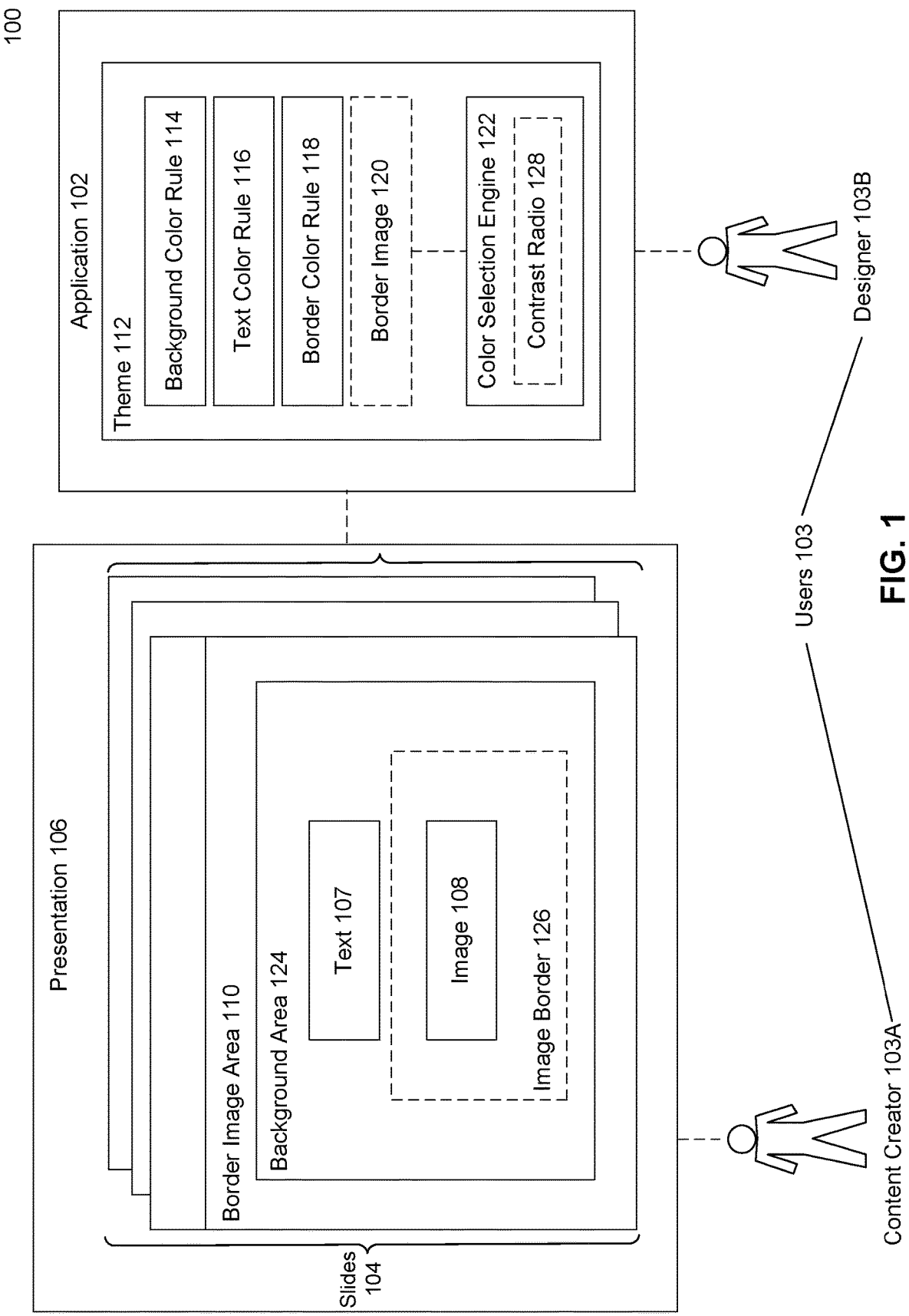
FIG. 1 is a block diagram 100 showing example operations for providing color theme maintenance for presentations, according to some embodiments.

FIG. 1 is a block diagram 100 showing example operations for providing color theme maintenance for presentations, according to some embodiments. Application 102 may be presentation software that enables a user 103A to create one or more slides 104 for a presentation 106. Application 102 may be a web-based, cloud-based, or local application, app, program, or other software accessible to one or more users 103 for design, operation, or viewing.

Presentation 106 may include any group of one or more slides 104. FIG. 1 illustrates a single enumerated slide 104, with several additional unenumerated similar slides 104 which are represented behind the enumerated slide 104. It would be understood by one skilled in the art, that references to a slide 104 or slides 104 may refer to any combination of the slides 104 as illustrated in FIG. 1. In an embodiment, presentation 106 may include slides 104 that are arranged within a particular file or instance of application 102. In an embodiment, presentation 106 may include slides 104 that pertain to a particular subject or project (as may be determined by a content creator 103A). Users 103 may create or format the slides 104 using application 102. In an embodiment, different users 103 may have different permissions with regard to how slides 104 are designed, arranged, or the content contained within the slides 104 of a particular presentation 106. As used herein, any collection of one or more slides 104, within a larger collection of slides 104, may be a presentation 106. As such, each presentation (or sub-presentation) of one or more slides 104, within the larger collection of slides 104 or presentation 106, may have its own its own customized and customizable theme elements. Users 103 may include content creators, theme designers_103B, and various other viewers of the presentation 106 or groups of slides 104. As used herein "user 103" may be used interchangeably with "content creator 103A" and be used to refer to any of these users 103A, 103B with permissions to perform the described functions. A viewer may be a user who has read-only permission to view one or more slides 104. Content creator 103A may be a user who has read-write access to one or more slides 104, to change the content of the slides. Content creator 103A may add, remove, and/or modify elements of different slides to which the user has write permission. In an embodiment, presentation 106 may include different slides 104 with different content creators 103A, or for example, one slide 104 may have multiple co-creators 103A.

Slides 104 may be a visual interface on which user may add, configure, remove, or modify different visual or interface elements such as text 107 or images 108 (including multimedia and other visual elements). In an embodiment, slides 104 may include two general types of elements: content elements and theme elements. Different content creators 103A may have different permissions with regard to their ability to write different content and/or theme elements to different slides 104. For example, a first creator 103A may be able to modify the content elements of a particular slide 104, but not the theme elements, while a second creator 103A may have access to modify both. The permissions may vary on a per-slide and/or per-creator basis.

Content elements may include elements such as text 107 and images 108. Text 107 may include alpha-numeric characters arranged in different formats such as text boxes and lists. Images 108 may include multimedia elements such as pictures, drawings, charts, graphs, video, audio, or other information. In an embodiment, content creator 103A with write permission may provide, select, modify, and arrange different content elements on the slides 104.

Each slide 104 may be unique and may include different content or content elements. For example, the content elements included in a first slide 104 may be independent (by creator 103A) of the content elements included in a second slide 104. Content elements exist independently from one another and may be selected and configured by creator 103A on a slide-by-slide basis.

Theme elements, by contrast, often include a dependency or require a consistency amongst multiple slides 104 of a presentation 106. Theme elements often create a consistency, uniformity, or cohesion between different slides 104 (with different content elements) of a presentation 106. A theme element, such as a background color when changed on one slide may propagate to other slides on the same presentation. Example theme elements may include, but are not limited to, color selections, font selections, border images 120, and page numbering.

In an embodiment, theme elements may include visual elements which are uniform, identical, or have dependencies or consistencies across multiple slides. For example, a change to a content element on a slide 104 may only change the particular slide 104 and not affect the content elements of any other slide 104. A change to a theme element however, such as background color, may propagate to other slides 104 of presentation 106.

In an embodiment, background color may be a theme element across multiple slides 104 of presentation 106, however it may be content element for other slides. For example, creator 103A may want to change the background color for a particular slide 104, while keeping the background color for the remaining slides 104 consistent. In an embodiment, theme elements may include rules that are applied across different slides 104 (with different content elements) of a presentation 106 that determine a visual appearance of the respective slide 104 based on the rules. Examples of these rules are discussed in greater detail below.

In conventional presentation software, a user (such as a content creator) may be responsible for manually providing and maintaining both content elements and theme elements for each slide of a particular presentation. For example, conventional presentation software may not distinguish between content elements and theme elements, and require the user to ensure any theme-related consistency amongst the slides. With regard to the theme elements, a user may have to decide the size of text boxes, how the text and images on a particular slide are to be arranged, the font type and size, the background color of that slide, etc. These selections may be done manually by the user on a slide-by-slide basis. Then, for example, if the user updates the theme elements of a particular slide, the user must make sure the other slides visual theme is consistent with the change. These selections, modifications, and this manual maintenance by the creator of a slide presentation require the user to spend lots of time making these selections and adjustments. Not only is this process onerous and time consuming for the user, but also there is no guarantee of consistency amongst the slides. Further, computing resources are wasted each time the slides are changed, saved, recompiled, and re-executed.

In application 102, by contrast, a theme 112 includes rules and selections pertaining to maintaining consistency of theme elements across slides 104 of presentation 106. Theme 112 may be or may be part of a master slide that maintains the rules, configurations, and selections (or selection criteria) for theme elements as they apply to slides 104 of a presentation 106. Rather than having each content creator 103A be responsible for maintaining theme elements across the slides 104, a designer 103B may pre-select or configure a theme 112 that keeps track of visual appearance selections and rules. Then for example, regardless of which or how many content creators 103A have write access to slides 104 of presentation 106, the theme elements may remain consistent. In an embodiment, designer 103B may have access to an application programming interface (API) through which designer 103B may configure theme 112.

A color selection engine 122 may monitor changes or detect events corresponding to changes to theme elements and automatically (without user intervention) enforce their uniformity across the slides 104 of presentation 106. In an embodiment, a creator 103A may have a manual override or exception for a particular theme element of a particular slide 104 (for example, changing the background color of one particular slide but maintaining the background color for all the remaining slides in accordance with theme 112).

With a theme 112 in place, content creators 103A may focus their time, energy, and computing resources on creating content elements for slides 104. During the content creation process, color selection engine 122 may determine when updates to the theme elements are necessary. For example, if content creator 103A adjusts the theme elements in a first slide, color selection engine 122 may update theme 112 accordingly and apply the change to the relevant slides 104. For example, rather than content creator 103A being tasked to determine where to place text boxes and what color font to use with a particular background color, different rules or selections of theme 112 may be used to manage the colors and other theme elements across slides 104 of presentation 106. In an embodiment, these selections may be updated based on different actions or particular selections by content creator 103A.

Application 102 may enable designers 103B to create themes 112 that may be used across different presentations 106 created with application 102. In an embodiment, designer 103B may be a user who has permissions or access to make selections or design rules (e.g., using an application programming interface) for a theme 112. Designer 103B may then make that theme 112 available to other users 103A for use or purchase. When a content creator 103A selects a particular theme 112, the selections and/or rules of the selected theme 112 are applied to and maintained on the slides 104 of the presentation 106 may a color selection engine 122. In an embodiment, creator 103A and designer 103B may be the same person, or have at least partially overlapping rights to modify theme elements. For example, designer 103B may create a theme 112, and may grant content creator 103A permission to modify particular theme elements or do one-off slide changes (e.g., such as change background colors but not font colors).

Theme 112 may include different criteria, rules, or guidelines for adjusting the visual appearance (including the color palette) of slides 104 of a particular presentation 106 to which theme 112 is applied without intervention or action by content creator 103A. For example, if content creator 103A selects a specific background color for background area 124, color selection engine 122 may implement the rules of theme 112 and adjust the color of text 107 and a color of an image border 126 automatically. In an embodiment, application 102 may provide content creator 103A an option for a manual override of one or more selections of theme 112. Color selection engine 122 may then adjust the other color selections (not specifically designated or overridden by creator 103A) based on whatever specific user selections were made based on the rules of theme 112. In an embodiment, theme 112 may include a background color rule 114, a text color rule 116, a border color rule 118, and a border image 120.

Border image 120 may be a design, image, text, pictures, or other multimedia that creates or is part of a cohesive border of one or more slides 104 of presentation 106. Border image 120 may indicate what, if anything, goes in border image area 110 of slides 104. In an embodiment, border image 120 may include a company's logo or presentation theme that indicates the presentation 106 is associated with the company. In an embodiment, border image 120 may include a company's logo, which may be available in different colors for different slides 104 depending on which other colors or content elements are selected. In an embodiment, the color log may be manually selected by creator 103A or chosen based on border image rules depending on other colors which have been selected for a particular slide or group of slides. In another embodiment, border image 120 may be uniform across all slides 104 regardless of what colors or content may be selected by content creator 103A.

The size or thickness of border image area 110 may be automatically maintained by the rules of theme 112. However, in an embodiment, content creator 103A may adjust the size or thickness of border image area 110. If a user changes the size of border image area 110, color selection engine 122 may automatically resize (without content creator 103A interaction) border image 120 based on the adjustment of border image area 110. In another embodiment, content creator 130 may also adjust the placement or appearance of border image 120 within the border image area 110 to determine how much or what parts of border image 120 are visible across slides 104.

Background color rule 114 may include criteria or rules for selecting a color of background area 124 of slides 104. In an embodiment, background color rule 114 may indicate an initial selection of a background color such as white, or a color associated with border image 120. For example, background color rule 114 may indicate different colors, or different shades or tints of colors with different contrast levels to account for different color selections (e.g., such as font or text color selections) which may be made by content creator 103A.

For example, background color rule 114 may indicate an initial selection of light green as a background color. However, content creator 130A may select green as a font color. Color selection engine 122 may determine a contrast ratio 128 between the green selection of font and the background color of light green. Contrast ratio 128 may indicate contrast or measure of a difference between two color selections. The greater the contrast ratio 128, the greater the differences between the colors, the easier it is to distinguish the colors (which may improve readability of text with a greater contrast). For example, the greatest contrast may exist between black and white colors. Increasing the contrast between two colors may include changing the brightness or adding black/white into the colors or making other color adjustments.

In an embodiment, theme 112 may include a contrast threshold between a font color selection and a background color selection. The contrast threshold may indicate a minimum level of contrast to ensure that the font color is distinguishable (readable) from the background color. If the contrast ratio 128 falls below the threshold, then color selection engine 122 may select a new font and/or background color/tint in accordance with background color rule 114 and/or text color rule 116.

In the example above, a user may specifically select a green font color. Color selection engine 122 may determine that a contrast ratio 128 between the green font color and the default light green background color falls below a contrast threshold. In an embodiment, color selection engine 122 may associate a priority to a specific user selection and because the user specifically selected a green font color, color selection engine 122 may select a different background color with a greater contrast ratio 128 (e.g., such as white). Or, for example, in another embodiment, the background color may not be able to be changed by content creator 103A, in which case application 102 may disable the selection of font colors that fall below the contrast threshold, or the user may be warned that the font selection falls below the threshold and may be provided different font colors from which to select that exceed the contrast threshold.

In an embodiment, background color rule 114 may specify how to automatically (without user action, request, or intervention) select a color for background area 124 based on which elements are included in slides 104, and particularly the colors associated with those elements. For example, background color rule 114 may indicate that any of multiple colors of border image 120 may be selected for background color for background area 124. Or, for example, colors from an image 108 selected by content creator 103A may be sampled to determine which of several background colors to use. In an embodiment, background color rule 114 may indicate to sample both colors of border image 120 and image 108 to determine a blended color or overlap of colors found in both images.

In an embodiment, background color rule 114 may indicate a contrast threshold between background area 124 (color) and a color of text 107. This contrast threshold may ensure a minimum level of visibility or distinction between a font color and background color. In an embodiment, the background color may vary amongst different slides 104 (e.g., if all the slides have an identical border image 120 in border image area 110), or may be maintained as uniform across the slides of presentation 1106 (for example if there is no cohesive border image 120 across the slides 104).

Text color rule 116 may determine how to select a color for text 107. Text color rule 116 may indicate different rules or criteria for selecting font/text colors on slides 104 similar to background color rule 114 does for background color. For example, which font color(s) may be available or selected may be based on part on which background color and/or border image 120 was selected. If a user selects or if a default background color has been selected, then color selection engine 122 may ensure that any selected font colors meet or exceed a contrast threshold between the font color and background color.

In an embodiment, when images 108 or other multimedia are dragged onto or otherwise included on a slide 104, the image 108 may include an image border 126. Image border 126 may create a border, area, or outline around image 108 and may separate or otherwise be distinguishable from background area 124. In an embodiment, theme 112 may include a contrast threshold between a color of background area 124 and a color of image border 126. In an embodiment, background color rule 114 may include an image border rule that indicates a rule or sub-rule for selecting a color of image border 126 relative to a color of background area 124.

In an embodiment, the contrast threshold between background area 124 and image border 126 may be less than the contrast threshold between background area 124 and font color (of text 107). These differences in contrast threshold may improve the visual appearance of elements of slides 104 in an interface. Furthermore, in an embodiment, border color 118 may indicate that the color of image border 126 be a different shade or tint of the same color of background area 124 or may otherwise indicate an upper bounds on a contrast ratio 128. In an embodiment, border color rule 118 may indicate what shape, dimensions, or thickness of the image border 126 are to be displayed as well.

In an embodiment, color selection engine 122 may automatically enforce the rules or guidelines of theme 112 without content creator 103A intervention. Or, for example, color selection engine 122 may receive particular selections of colors or other visual elements by content creator 103A and may automatically adjust the remaining colors according to theme 112 or provide content creator 103A options for selecting corresponding colors in accordance with theme 112.

Figure 2:
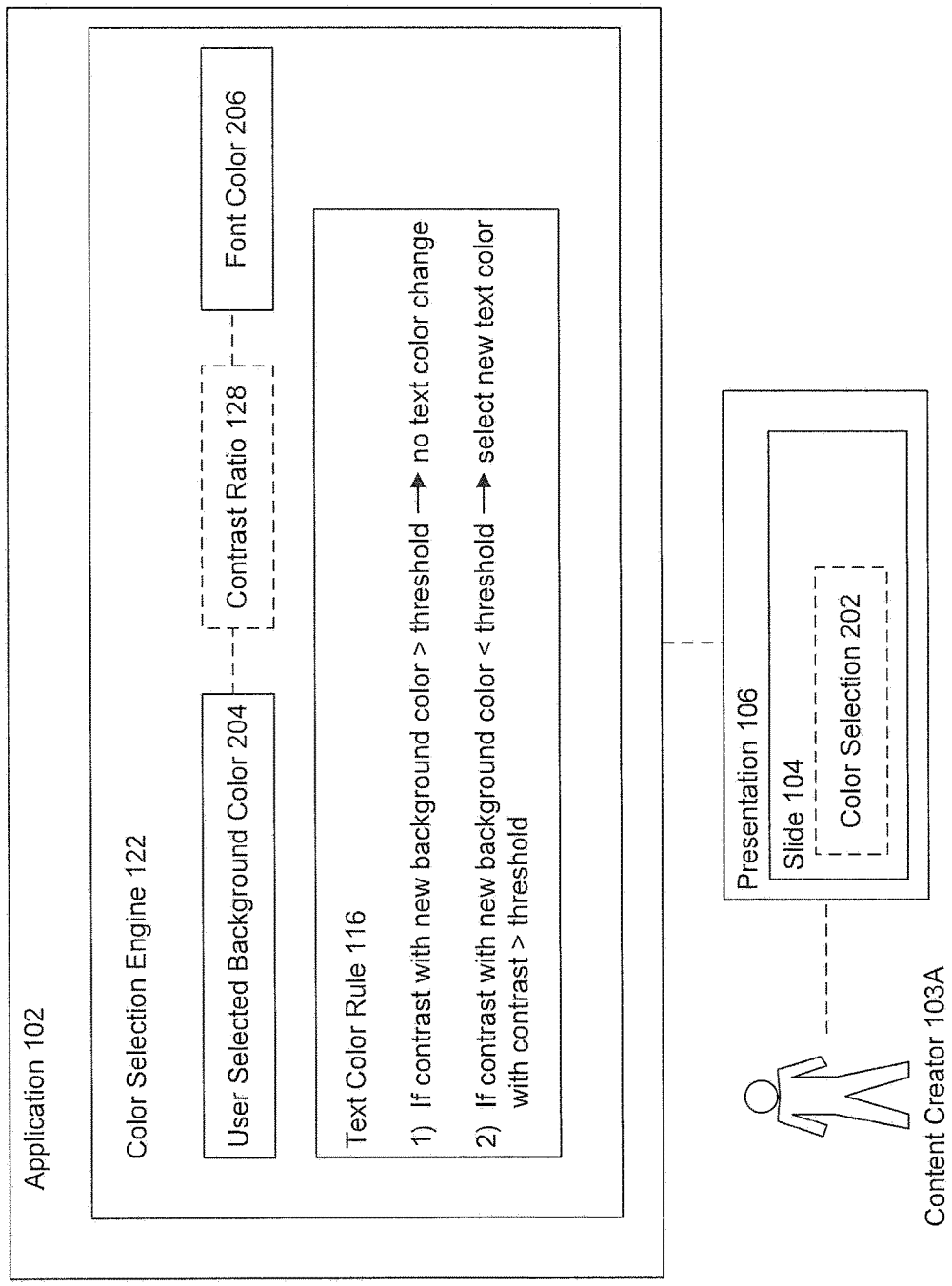
FIG. 2 is a block diagram 200 showing example operations of a color selection engine, according to some embodiments.

FIG. 2 is a block diagram 200 showing example operations of a color selection engine 122, according to some embodiments. Content creator 103A may make a specific color selection 202 pertaining to selecting a color of text, background, border, or border image. In the example shown color selection engine 122 may determine that the color selection 202 corresponds to a user selected background color 204. However, in other embodiments, the color selection 202 may be a user selection or change to any of the colors or theme elements defined by theme 112.

Based on receiving an event indicating a change in background color (e.g., user selected background color 204), color selection engine 122 may determine whether a text color needs to be updated based on text color rule 116. In the example shown, text color rule 116 includes two rules that indicate which text color to select based on the contrast ratio 128 of the selected background color with a selected font color 206. Though contrast ratio 128 has been described herein, other visual indicators may be used to determine various colors to be used. These other visual indicators include, but are not limited to, brightness, hue, and saturation. In an embodiment, text color rule 116 may include separate thresholds or ratios for different visual indicators.

Upon receipt of the user selected background color 240, color selection engine may compute a contrast ratio 128 between the selection and an existing font color 206. Then in accordance with text color rule 116, may select a new text or font color, or may keep the same text or font color. A similar process may be performed by colors selection engine 122 with respect to selecting a new border color as well based on border color rule 118.

In the example shown, if the new contrast (between the font color and the new background color indicated by color selection 202) exceeds a threshold, then a text color does not change. If, however, the new contrast is less than a threshold, then a new text color such that the contrast exceeds the threshold may be selected to maintain consistency with text color rule 116. In an embodiment, color selection engine 122 may determine which font colors exceed the threshold and select a color. Or, for example, color selection engine 122 may prompt a user to select a new font color from the available font colors (e.g., that exceed the contrast threshold).

Figure 3:
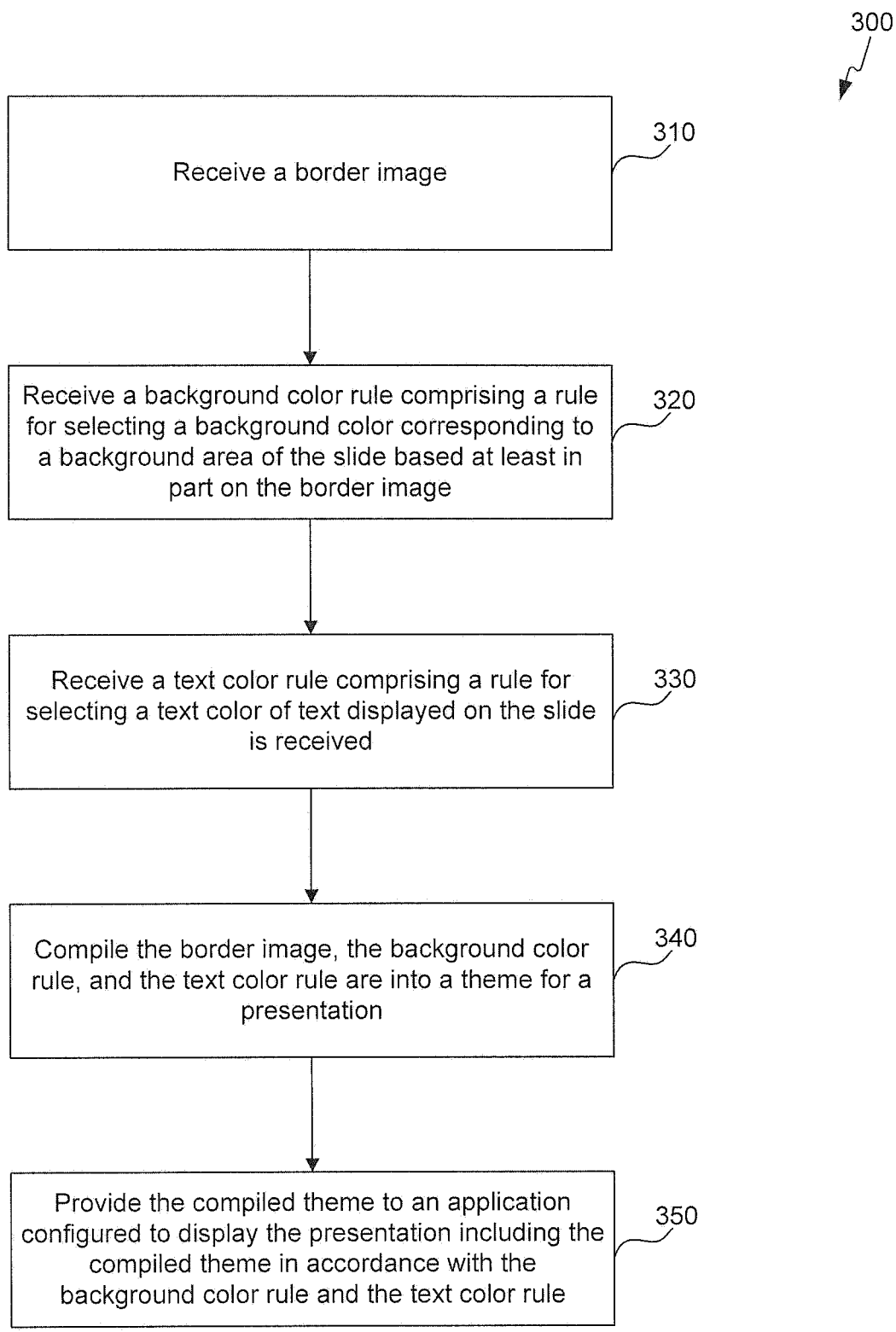
FIG. 3 is a flowchart illustrating a process for providing color theme maintenance for presentations, according to some embodiments.

FIG. 3 is a flowchart illustrating a process 300 for providing color theme maintenance for presentations, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 310, a border image is received. For example, application 102 may receive border image 120 from designer 103B during a design of template 112. Border image 120 may include any picture or design, such as a company logo, that is displayed in border image area 110 of one or more slides 104. In an embodiment, creator 103A may upload a border image 120 at runtime of application 102. Or, for example, content creator 103A may toggle border image area 110 on/off, or change the colors of border image 120. In an embodiment, designer 103B may provide several different versions or colors of border image 120, which may be selected by creator 103 or selected based on rules of theme 112.

At 320, a background color rule comprising a rule for selecting a background color corresponding to a background area of the slide based at least in part on the border image is received. For example, application 102 may receive background color rule 114 from designer 103B during a design-time process or operation of application 102. Background color rule 114 may indicate various criteria for determining which background color is selected for background area 124 of slides 104. One of the criteria may include determining whether the border image area 124 includes border image 120, and if so, using or sampling colors from border image 120 to determine one or more background colors to use. For example, if border image includes pink and green colors, then shades of pink or green may be used as background color, or a neutral color such as white may be selected. Designer 103B may specific which colors may or may not be used or may be recommended to creator 103A for use via background color rule 114.

At 330, a text color rule comprising a rule for selecting a text color of text displayed on the slide is received. For example, application 102 may receive text color rule 114 from designer 103B during a design-time process or operation of application 102. Text color rule 116 may indicate how text colors of text 107 are selected, similar to background color rule 114. In an embodiment, one criterion for determining which text color to select may be based on which background color is selected. For example, if creator 103A selects a new background color, based on text color rule 116, color selection engine 122 may update the text color. Or, for example, if the text color is changed, then color selection, engine 122 may likewise update the background color based on background color rule 114.

At 340, the border image, the background color rule, and the text color rule are compiled into the theme for the presentation. For example, when theme is complete application 102 or another processor may compile theme for use with one or more presentations 106 created or modified with application 102. In an embodiment, different themes 112 may be provided via a theme or app store. Then for example, creator 103A may select or preview different themes 112 with their presentations 106.

At 350, the compiled theme is provided to an application configured to display the presentation including the compiled theme in accordance with the background color rule and the text color rule. For example, color selection engine 122 may automatically apply the rules, parameters, and selections of theme 112 to slides 104 of presentation 106 without user request or action. For example, color selection engine 122 may prevent selections that violate different rules, or may automatically change color selections responsive to manual overrides or other creator 103A selections. In an embodiment, creator 103A may select a new theme 112 after having created several slides, and color selection engine 122 may apply or fit the theme to the previously created slides 104.

Figure 4:
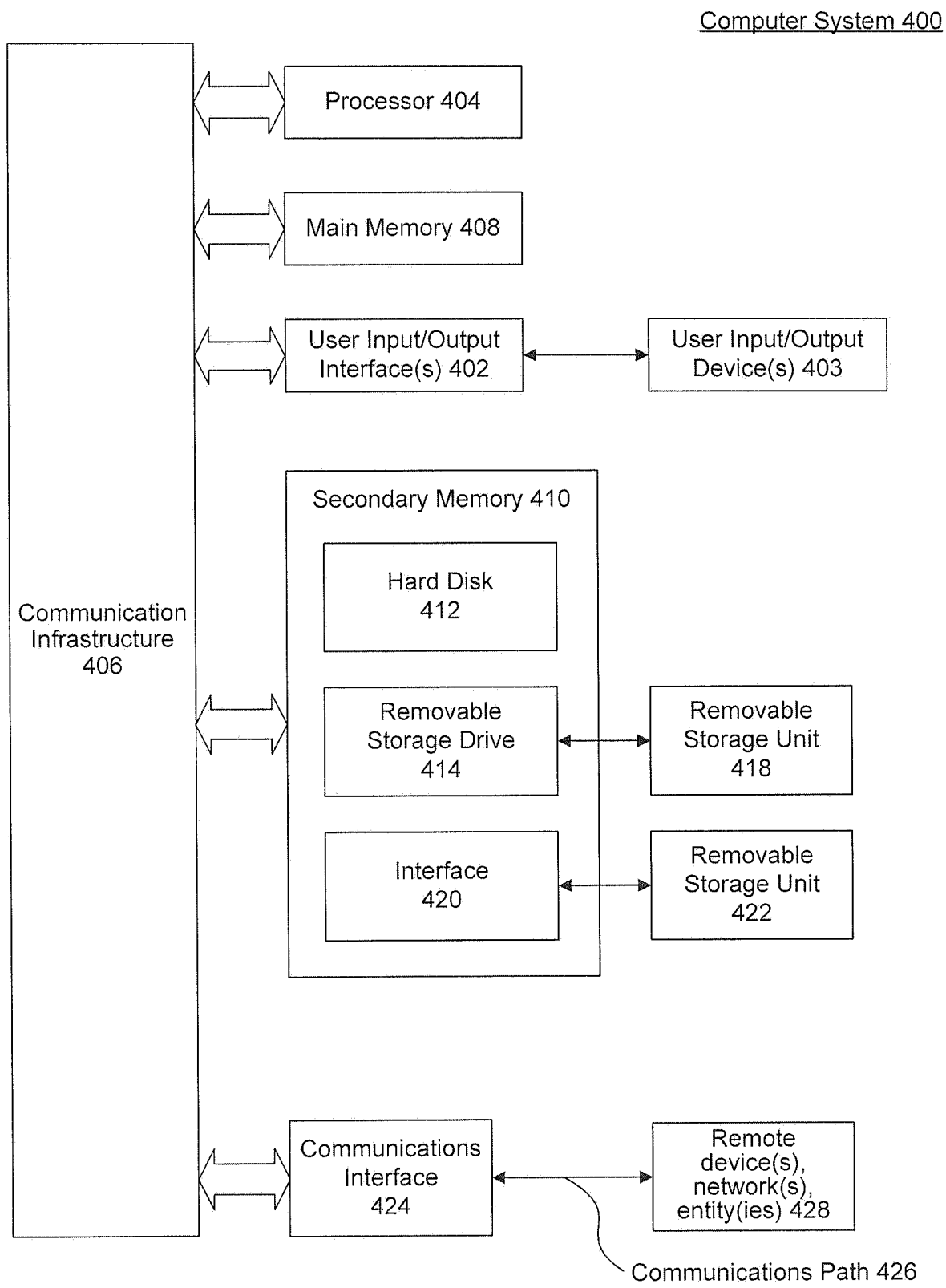
FIG. 4 is an example computer system useful for implementing various embodiments.

Various embodiments can be implemented, for example, using one or more computer systems, such as computer system 400 shown in FIG. 4. Computer system 400 can be used, for example, to implement the systems described above with respect to the figures, and/or the method of FIG. 3. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for creating a theme for a presentation of an application, comprising:
   receiving a border image, wherein the border image is for display within a border image area of a slide of the presentation;
   receiving a background color rule comprising a rule for selecting a background color corresponding to a background area of the slide based at least in part on the border image;
   receiving a text color rule comprising a rule for selecting a text color of text displayed on the slide, wherein the text color rule indicates which of a plurality of available text colors to select based on a change of the background color;
   compiling, by a processor, the border image, the background color rule, and the text color rule into the theme for the presentation;
   providing the compiled theme to an application configured to display the presentation including the compiled theme in accordance with the background color rule and the text color rule;
   detecting a request to change to one of the text color of text displayed on the slide or the background color, wherein the other of the text color or the background color is unrequested;
   determining, responsive to the detecting, that an option to change the unrequested color is disabled and the unrequested color remains unchanged;
   displaying, responsive to the detecting, a subset of colors that satisfy a contrast ratio threshold between the text color and the background color with which to replace the color corresponding to the request to change for selection by a user, wherein a contrast ratio between the unrequested color and each of the subset of colors satisfy the contrast ratio threshold; and
   receiving, from a user, a selection of one of the subset of colors with which to replace the color corresponding to the request.

2. The method of claim 1, wherein the receiving the border image comprises:
   determining one or more colors associated with the border image.

3. The method of claim 1, wherein receiving the background color rule comprises:
   indicating a criteria as to which of a plurality of background colors to select based on an image for display in the slide, wherein the image includes one or more of a plurality of image colors, and wherein the criteria specifies which background color to select based on which image colors are represented in the image.

4. The method of claim 3, wherein the selection of the background color is based on a proportion between a plurality of image colors identified within the image.

5. The method of claim 3, further comprising:
   determining that the background color rule includes an image border rule that indicates which of a plurality of colors to select for an image border based on the selected background color, wherein the image border comprises a border area around the image, and wherein the color of the image border is distinguishable from but also associated with the background color.

6. The method of claim 1, wherein the receiving a border image comprises:
   receiving a first border image with a first color theme corresponding to a first contrast ratio to the background color; and
   receiving a second border image with a second color theme corresponding to a second contrast ratio to the background color;
   wherein the background color rule indicates which border image to display based on a selection of the background color.

7. The method of claim 1, wherein the text color rule indicates which of plurality of text colors to select based on a contrast ratio between the plurality of colors and the background color.

8. The method of claim 7, wherein the contrast ratio between the background color and the text color is greater than a contrast ratio between the background color and a background image color.

9. The method of claim 1 wherein the determining that the contrast ratio between the text color and the background color falls below the contrast ratio threshold comprises:
   displaying a warning that the change will cause the contrast ratio to fall below the contrast ratio threshold; and
   providing an alternative one or more colors that satisfy the contrast threshold.

10. The method of claim 1, further comprising:
    determining a second contrast threshold between an image border and the background color that is different from the contrast ratio between the text color and the background color.

11. A system, comprising:
    a memory; and
    at least one processor coupled to the memory and configured to:
      receive a border image, wherein the border image is for display within a border image area of a slide of a presentation;
      receive a background color rule comprising a rule for selecting a background color corresponding to a background area of the slide based at least in part on the border image;
      receiving a text color rule comprising a rule for selecting a text color of text displayed on the slide, wherein the text color rule indicates which of a plurality of available text colors to select based on a change of the background color;
      compile, by a processor, the border image, the background color rule, and the text color rule into a theme for the presentation;
      provide the compiled theme to an application configured to display the presentation including the compiled theme in accordance with the background color rule and the text color rule;
      detect a request to change to one of the text color of text displayed on the slide or the background color, wherein the other of the text color or the background color is unrequested;
      determine, responsive to the detecting, that an option to change the unrequested color is disabled and the unrequested color remains unchanged;

display, responsive to the detecting, a subset of colors that satisfy a contrast ratio threshold between the text color and the background color with which to replace the color corresponding to the request to change for selection by a user, wherein a contrast ratio between the unrequested color and each of the subset of colors satisfy the contrast ratio threshold; and receive, from a user, a selection of one of the subset of colors with which to replace the color corresponding to the request.

12. The system of claim 11, wherein the processor configured to receive the border image is configured to:
determine one or more colors associated with the border image.

13. The system of claim 11, wherein the processor configured to receive the background color rule is configured to:
indicate a criteria as to which of a plurality of background colors to select based on an image for display in the slide, wherein the image includes one or more of a plurality of image colors, and wherein the criteria specifies which background color to select based on which image colors are represented in the image.

14. The system of claim 13, wherein the selection of the background color is based on a proportion between a plurality of image colors identified within the image.

15. The system of claim 13, wherein the processor is further configured to:
determining that the background color rule includes an image border rule that indicates which of a plurality of colors to select for an image border based on the selected background color, wherein the image border comprises a border area around the image, and wherein the color of the image border is distinguishable from but also associated with the background color.

16. The system of claim 11, wherein the text color rule indicates which of plurality of text colors to select based on a contrast ratio between the plurality of colors and the background color.

17. The system of claim 16, wherein a contrast ratio between the background color and the text color is greater than a contrast ratio between the background color and a background image color.

18. A computer system having instructions stored on a memory thereon that when executed by at least one processor of the device, causes the at least one processor to perform operations comprising:
receiving a border image, wherein the border image is for display within a border image area of a slide of a presentation;
receiving a background color rule comprising a rule for selecting a background color corresponding to a background area of the slide based at least in part on the border image;
receiving a text color rule comprising a rule for selecting a text color of text displayed on the slide, wherein the text color rule indicates which of a plurality of available text colors to select based on a change of the background color;
compiling, by a processor, the border image, the background color rule, and the text color rule into a theme for the presentation;
providing the compiled theme to an application configured to display the presentation including the compiled theme in accordance with the background color rule and the text color rule;
detecting a request to change to one of the text color of text displayed on the slide or the background color, wherein the other of the text color or the background color is unrequested;
determining, responsive to the detecting, that an option to change the unrequested color is disabled and the unrequested color remains unchanged;
displaying, responsive to the detecting, a subset of colors that satisfy a contrast ratio threshold between the text color and the background color with which to replace the color corresponding to the request to change for selection by a user, wherein a contrast ratio between the unrequested color and each of the subset of colors satisfy the contrast ratio threshold; and
receiving, from a user, a selection of one of the subset of colors with which to replace the color corresponding to the request.

19. The system of claim 18, wherein the operations further comprise:
determining that the background color rule includes an image border rule that indicates which of a plurality of colors to select for an image border based on the selected background color, wherein the image border comprises a border area around the image, and wherein the color of the image border is distinguishable from but also associated with the background color.

20. The system of claim 18, wherein the receiving a border image comprises:
receiving a first border image with a first color theme corresponding to a first contrast ratio to the background color;
receiving a second border image with a second color theme corresponding to a second contrast ratio to the background color;
wherein the background color rule indicates which border image to display based on a selection of the background color.

* * * * *

UNITED STATES PATENT AND TRADEMARK OFFICE
CERTIFICATE OF CORRECTION

PATENT NO. : 10,755,030 B2  
APPLICATION NO. : 15/637096  
DATED : August 25, 2020  
INVENTOR(S) : Andrew Chung et al.

Page 1 of 1

It is certified that error appears in the above-identified patent and that said Letters Patent is hereby corrected as shown below:

In the Specification

In the Cross Reference to Related Applications:

Column 1, Line 8, "15/537,729, filed Jun. 29, 2017," should read --15/637,729, filed Jun. 29, 2017,--.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*